United States Patent
Kang et al.

(10) Patent No.: US 10,138,832 B2
(45) Date of Patent: Nov. 27, 2018

(54) APPARATUS AND METHOD FOR CONTROLLING ENGINE

(71) Applicants: Hyundai Motor Company, Seoul (KR); Kia Motors Corporation, Seoul (KR)

(72) Inventors: Ji Hoon Kang, Seoul (KR); Jong Bum Oh, Gyeonggi-do (KR); Jea Mun Lee, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/613,050

(22) Filed: Jun. 2, 2017

(65) Prior Publication Data

US 2018/0163653 A1    Jun. 14, 2018

(30) Foreign Application Priority Data

Dec. 12, 2016  (KR) .................. 10-2016-0168787

(51) Int. Cl.
*F02D 41/04*  (2006.01)
*F16H 63/50*  (2006.01)
(Continued)

(52) U.S. Cl.
CPC ............ *F02D 41/045* (2013.01); *F02D 11/02* (2013.01); *F16H 63/50* (2013.01);
(Continued)

(58) Field of Classification Search
CPC ...... F02D 11/02; F02D 41/0225; F02D 41/26; F02D 41/045; F02D 41/0057; F02D 41/3035; F02D 41/3076; F16H 63/50
(Continued)

(56) References Cited

U.S. PATENT DOCUMENTS 6,246,951 B1 *  6/2001  Robichaux ............ F02D 11/105
                                              701/110
6,357,419 B1 *  3/2002  Langer ................ F02D 35/0023
                                              123/443
(Continued)

FOREIGN PATENT DOCUMENTS

KR    10-0792892 B1    1/2008
KR    10-1566736 B1    11/2015
KR    2016-0046631 A    4/2016

*Primary Examiner* — John Kwon
*Assistant Examiner* — Johnny H Hoang
(74) *Attorney, Agent, or Firm* — Mintz Levin Cohn Ferris Glovsky and Popeo, P.C.; Peter F. Corless (57) ABSTRACT

An engine control apparatus and an engine control method are provided. The engine control apparatus includes an accelerator pedal position sensor that measures a position of an accelerator pedal in response to an operation of the accelerator pedal. Additionally, a vehicle controller verifies whether a driver demand torque is equal to or greater than a current engine torque when the position of the accelerator pedal is deviated from a reference position while an engine is operated in a part load mode and determines whether to permit a transition of an engine mode of the engine to a full load mode. An engine controller then transitions the engine mode to the full load mode from the part load mode in response to a control of the vehicle controller.

14 Claims, 5 Drawing Sheets

(51) Int. Cl.
*F02D 11/02* (2006.01)
*F02D 41/02* (2006.01)
*F02D 41/26* (2006.01)

(52) U.S. Cl.
CPC .... *F02D 41/0225* (2013.01); *F02D 2200/501* (2013.01); *F02D 2200/602* (2013.01); *F02D 2250/18* (2013.01)

(58) Field of Classification Search
USPC ......... 701/102, 106, 107, 110–115; 123/295, 123/299, 300, 339.1, 399, 478, 480
See application file for complete search history.

(56) References Cited

U.S. PATENT DOCUMENTS

| | | | | |
|---|---|---|---|---|
| 6,827,070 B2* | 12/2004 | Fehl | .................... | F02D 41/1458 123/682 |
| 7,124,012 B2* | 10/2006 | Feder | .................... | F02D 11/105 701/101 |
| 2008/0177457 A1* | 7/2008 | Ishikawa | ............. | F02B 23/0669 701/103 |
| 2015/0183418 A1 | 7/2015 | Shin et al. | | |

\* cited by examiner

APPARATUS AND METHOD FOR CONTROLLING ENGINE

CROSS-REFERENCE TO RELATED APPLICATION

This application is based on and claims the benefit of priority to Korean Patent Application No. 10-2016-0168787, filed on Dec. 12, 2016, in the Korean Intellectual Property Office, the disclosure of which is incorporated herein in its entirety by reference.

TECHNICAL FIELD

The present disclosure relates to an engine control apparatus that improves a delay in acceleration of an engine and a sense of difference caused by a variation in engine torque by delaying a transition time point of an engine mode when a driver demand torque based on a position of an accelerator pedal is less than a current engine torque even though the position of the accelerator pedal satisfies a full load mode entry condition during the process of transiting the engine mode to the full load mode from a part load mode, and an engine control method.

BACKGROUND

An engine mode of a hybrid vehicle is classified into an idling mode, a part load mode, and a full load mode based on a driving state of the engine. For the engine to enter the full load mode, any one condition of the following three conditions is required to be satisfied. The entry into the full load mode is permitted when an amount of depression of the accelerator pedal is equal to or greater than a reference amount. The entry into the full load mode is permitted when a demand torque of the driver is equal to or greater than a reference torque. The entry into the full load mode is permitted when a demand power of the driver is equal to or greater than a reference power.

As described above, although the demand torque or the demand power of the driver does not satisfy the full load mode entry condition, the entry into the full load mode is allowed when the position of the accelerator pedal satisfies the full load mode entry condition. Accordingly, when the engine enters the full load mode by the position of the accelerator pedal even though the driver demand torque corresponds to a driver demand torque (a part load engine operating point) at which the part load control is possible, the engine torque is instantly decreased, and thus an acceleration delay of an engine and a sense of difference, e.g., vibration, jerk, shock, or the like, caused by a variation in engine torque occurs.

SUMMARY

The present disclosure has been made to solve the above-mentioned problems occurring in the prior art while advantages achieved by the prior art are maintained intact. An aspect of the present disclosure provides an engine control apparatus capable of improving an acceleration delay of an engine and a sense of difference caused by a variation in engine torque by delaying a transition time point of an engine mode when a driver demand torque based on a position of an accelerator pedal is less than a current engine torque even though the position of the accelerator pedal satisfies a full load mode entry condition during the process of transiting the engine mode to the full load mode from a part load mode, and an engine control method. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an engine control apparatus may include an accelerator pedal position sensor configured to measure a position of an accelerator pedal in response to an operation of the accelerator pedal, a vehicle controller configured to verify whether a driver demand torque is equal to or greater than a current engine torque when the position of the accelerator pedal is deviated or changed from a reference position while an engine is operated in a part load mode and determine whether to permit a transition of an engine mode of the engine to a full load mode, and an engine controller configured to switch the engine mode to the full load mode from the part load mode in response to a control of the vehicle controller.

Further, the vehicle controller may be configured to prohibit or restrict the transition of the engine mode to the full load mode when the position of the accelerator pedal is not deviated from reference position (e.g., remains in the reference position). The vehicle controller may also be configured to prohibit the transition of the engine mode to the full load mode when the driver demand torque is less than the current engine torque. The vehicle controller may be configured to calculate the driver demand torque based on the position of the accelerator pedal, a position of a brake pedal, a current gear position, and a vehicle speed.

According to another aspect of the present disclosure, an engine control method may include sensing an operation or engagement of an accelerator pedal while an engine is operated in a part load mode, verifying whether a position of the accelerator pedal based on the operation of the accelerator pedal is deviated from a reference position, verifying whether a driver demand torque is equal to or greater than a current engine torque when the position of the accelerator pedal based on the operation of the accelerator pedal is deviated from a reference position, and determining whether to permit a transition of an engine mode of the engine to a full load mode based on whether the driver demand torque is equal to or greater than the current engine torque.

The verifying of whether the position of the accelerator pedal is deviated from the reference position may include prohibiting or restricting the transition of the engine mode to the full load mode when the position of the accelerator pedal is not deviated from the reference position (e.g., remains at the reference position). The determination of the permission of the transition to the full load mode may include permitting the transition of the engine mode to the full load mode from a part load mode when the drive demand torque is equal or greater than the current engine torque. Additionally, the determination of the permission of the transition to the full load mode may include prohibiting the transition of the engine mode to the full load mode when the driver demand torque is less than the current engine torque. The driver demand torque may be calculated based on the position of the accelerator pedal, a position of a brake pedal, a current gear position, and a vehicle speed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Throughout the specification, unless explicitly described to the contrary, it will be understood that the terms such as "part", "section", "module", etc., which are described in the specification, mean a unit of a comprehensive configuration that performs at least one function or operation, and is implemented by hardware or software or a combination of hardware and software. In addition, the "one", "a(an)" and "the(said)" used herein in single forms are intended to include the plural forms as well, unless the context clearly indicates otherwise.

Figure 1:
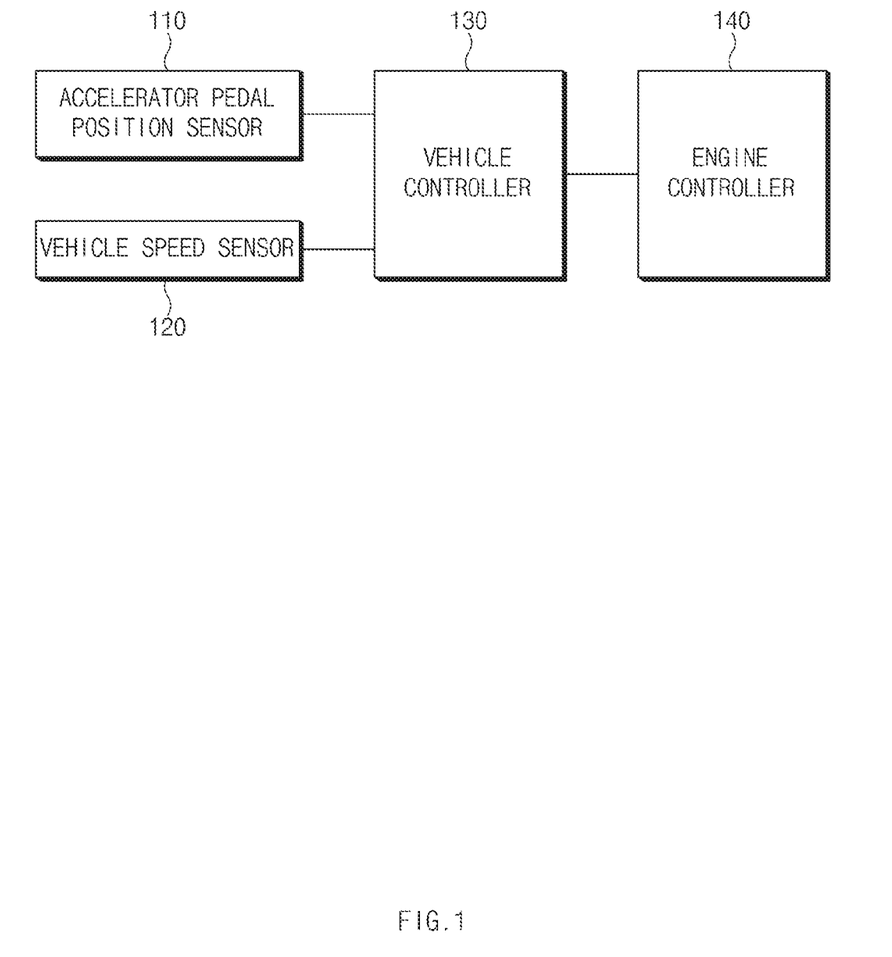
FIG. 1 is a block diagram showing an engine control apparatus according to an exemplary embodiment of the present disclosure.
Figure 2:
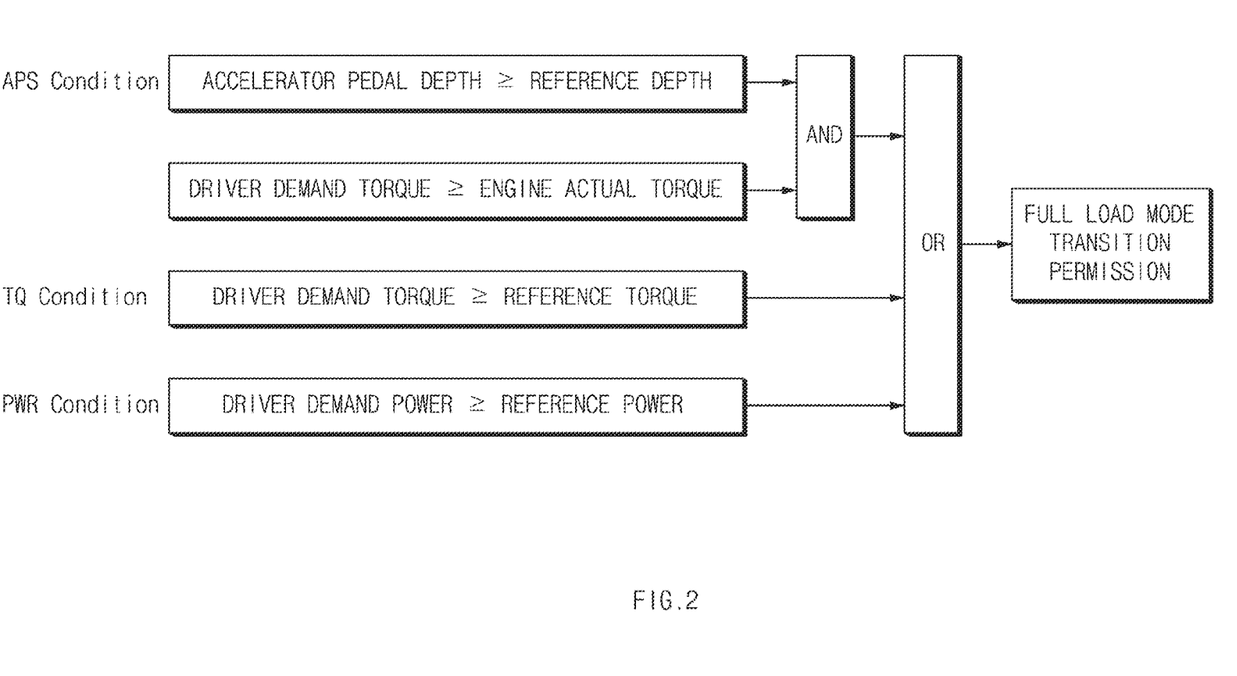
FIG. 2 is a block diagram showing a condition transited to a full load mode according to an exemplary embodiment of the present disclosure.

Hereinafter, exemplary embodiments of the present disclosure will be described in detail with reference to accompanying drawings. FIG. 1 is a block diagram showing an engine control apparatus according to an exemplary embodiment of the present disclosure, and FIG. 2 is a block diagram showing a transition condition to a full load mode according to an exemplary embodiment of the present disclosure.

The engine control apparatus may include an accelerator pedal position sensor (accelerator position sensor, APS) 110, a vehicle speed sensor 120, a vehicle controller 130, and an engine controller 140. The accelerator pedal position sensor 110 may be configured to output an engagement degree (e.g., an accelerator pedal engagement depth or an amount of pressure exerted onto the pedal to detect a position thereof) of an accelerator pedal depression by a driver as an electrical signal. In other words, the accelerator pedal position sensor 110 may be configured to measure a position of the accelerator pedal in response to a driver's operation. For instance, when the accelerator pedal is fully depressed or engaged, the degree of the accelerator pedal depression is about 100%, and when the accelerator pedal is fully released, the degree of the accelerator pedal depression is about 0%.

The vehicle speed sensor 120 may be mounted on a wheel of a vehicle to measure a vehicle speed. The vehicle speed sensor 120 provides information regarding the measured vehicle speed to the vehicle controller 130. Each of the vehicle controller 130 and the engine controller 140 includes a processor and a memory. The processor may be configured to execute an overall operation of the vehicle controller 130 and the engine controller 140, respectively, and the memory may be configured to store programs, input/output data, and various setting information for the operation of the vehicle controller 130 and the engine controller 140. The memory may be implemented by at least one storage of a flash memory, a hard disk, a secure digital (SD) card, a random access memory (RAM), a read only memory (ROM), or web storage.

The vehicle controller 130 is a top-level (e.g., upper) controller configured to execute an overall operation of the vehicle. The vehicle controller 130 also integratedly operates other controllers (e.g., electronic control units) connected to the vehicle controller 130 via a vehicle network. The vehicle controller 130 may be implemented by a hybrid controller (e.g., hybrid control unit, HCU). The vehicle network may be controller area network (CAN), FlexRay, media oriented systems transport (MOST), or local interconnect network (LIN). The other controllers may be an engine control unit (ECU), a battery management system (BMS), an electronic stability control (ESC), a traction control system (TCS), an antilock brake system (ABS), a motor control unit (MCU), and the like.

Particularly, the vehicle controller 130 may be configured to determine a driver demand torque and a driver demand power based on accelerator pedal position information output from the accelerator pedal position sensor 110. The vehicle controller 130 may be configured to consider a position of a brake pedal measured by a brake pedal sensor (BPS), a change of the vehicle speed or torque according to a current gear position, in addition to the accelerator pedal position information to determine the driver demand torque and the driver demand power. The brake pedal position may specifically be used to determine whether a regenerative braking is actuated when braking the vehicle.

The vehicle controller 130 may be configured to verify whether the accelerator pedal position, the driver demand torque, and the driver demand power satisfy a transition condition to the full load mode (e.g., a full load mode entry condition) to determine an engine mode. The engine mode is classified into a stop mode, an idling mode, a part load mode, and a full load mode based on a driving state of the engine. The stop mode indicates a state in which the engine is turned off, and the idling mode indicates a low rotation state of the engine, i.e., an idle state. The part load mode indicates a state in which a throttle valve is opened slightly to change a rotation speed of the engine and to exert influence on actual driving state, and the full load mode indicates a state in which the throttle valve is fully opened to allow the engine to operate in maximum torque.

Referring to FIG. 2, the transition condition to the full load mode is as follows.

1) The accelerator pedal depth is required to be equal to or greater than a reference depth (e.g., a predetermined depth), and the driver demand torque (e.g., a driver demand torque at a time point at which the accelerator pedal depth satisfies the transition condition) is required to be equal to or greater than an engine actual torque (e.g., a part load engine operating point). In other words, when the accelerator pedal is deeply depressed beyond the reference depth and the driver demand torque is equal to or greater than the current engine actual torque, the vehicle controller 130 may be configured to allow or permit the transition to the full load mode. The engine actual torque may be determined based on MAP data previously stored in the memory. The MAP data may be derived from repeated test results on the engine. In the present exemplary embodiment, the engine actual torque may be determined based on the MAP data, but it should not be limited thereto or thereby. In other words, the engine actual torque may be implemented to be directly measured using a sensor.

2) The driver demand torque is required to be equal to or greater than a maximum torque in the part load(e.g., a predetermined torque).

3) The driver demand power is required to be equal to or greater than a maximum power in the part load(a predetermined power).

The vehicle controller 130 may be configured to permit the transition (entry) to the full load mode if any one transition conditions among the above-mentioned three transition conditions is satisfied. The engine controller 140 is the engine control unit (ECU) and may be configured to execute the overall operation of the engine based on the driver demand torque and engine state information (e.g., the engine torque). The engine controller 140 may be configured to enter the engine mode determined by the vehicle controller 130. For instance, when the engine controller 140 receives a signal, which indicates the transition to the full load mode, from the vehicle controller 130 during the part load mode, the engine controller 140 may be configured to allow the engine to transition to the full load mode from the part load mode.

Figure 3:
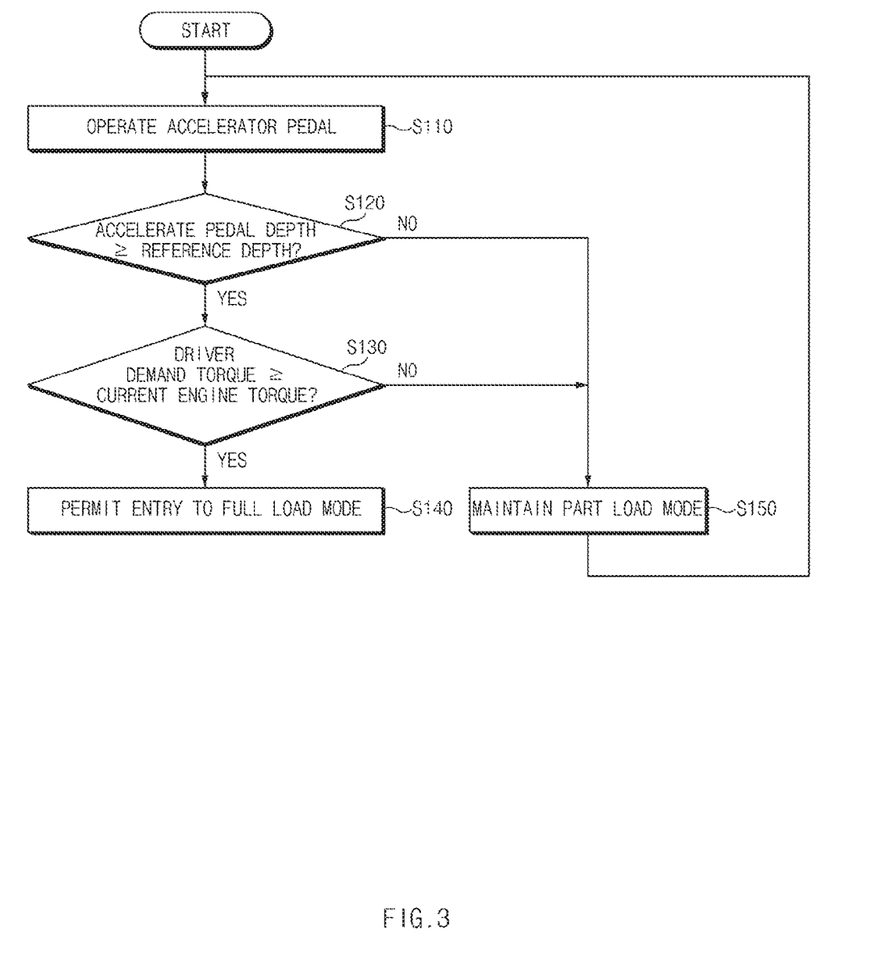
FIG. 3 is a flowchart showing an engine control method according to an exemplary embodiment of the present disclosure.

FIG. 3 is a flowchart showing an engine control method according to an exemplary embodiment of the present disclosure. In the present exemplary embodiment, a procedure of determining whether to permit the transition to the full load mode while the engine is operated in the part load mode will be described.

The vehicle controller 130 may be configured to sense an operation of the accelerator pedal when the engine is operated in the part load mode (S110). In particular, the vehicle controller 130 may be configured to measure the position of the accelerator pedal (e.g., the accelerator pedal depth) using the accelerator pedal position sensor 110. The vehicle controller 130 may then be configured to verify whether the position of the accelerator pedal satisfies the transition condition to the full load mode (S120). Additionally, the vehicle controller 130 may be configured to verify whether the accelerator pedal depth is equal to or greater than the reference depth.

When the position of the accelerator pedal satisfies the transition condition to the full load mode, the vehicle controller 130 may be configured to verify whether the driver demand torque is equal to or greater than the current engine actual torque (e.g., current engine torque) (S130). When the driver demand torque is equal to or greater than the current engine torque, the vehicle controller 130 may be configured to allow the engine to transition (enter) to the full load mode (S140). The vehicle controller 130 may then be configured to output the signal indicating the entry to the full load mode to the engine controller 140. In response, the engine controller 140 may be configured to operate the engine in the full load mode.

In operation S120, when the position of the accelerator pedal does not satisfy the transition condition to the full load mode, the vehicle controller 130 may be configured to prohibit or restrict the transition to the full load mode and maintain the part load mode (S150). Particularly, the vehicle controller 130 may be configured to restrict the entry to the full load mode when the accelerator pedal depth is less than the reference depth. In operation S130, when the driver demand torque is less than the current engine torque, the vehicle controller 130 may be configured to maintain the part load mode (S150). In other words, although the position of the accelerator pedal satisfies the transition condition to the full load mode, the vehicle controller 130 may be configured to restrict the transition to the full load mode and maintain the current engine mode when the driver demand torque is less than the current engine torque.

Figure 4:
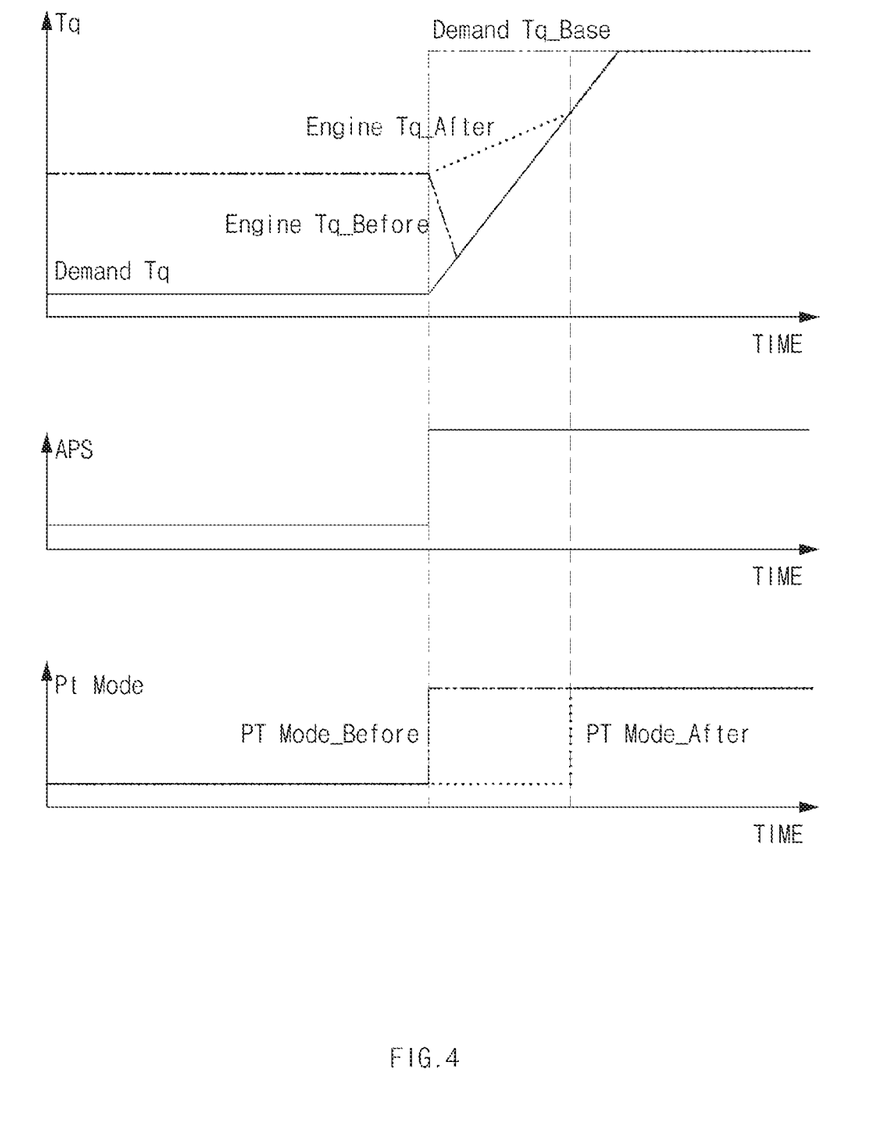
FIGS. 4 and 5 are views showing an engine mode according to a position of an accelerator pedal according to an exemplary embodiment of the present disclosure and a conventional vehicle.
Figure 5:
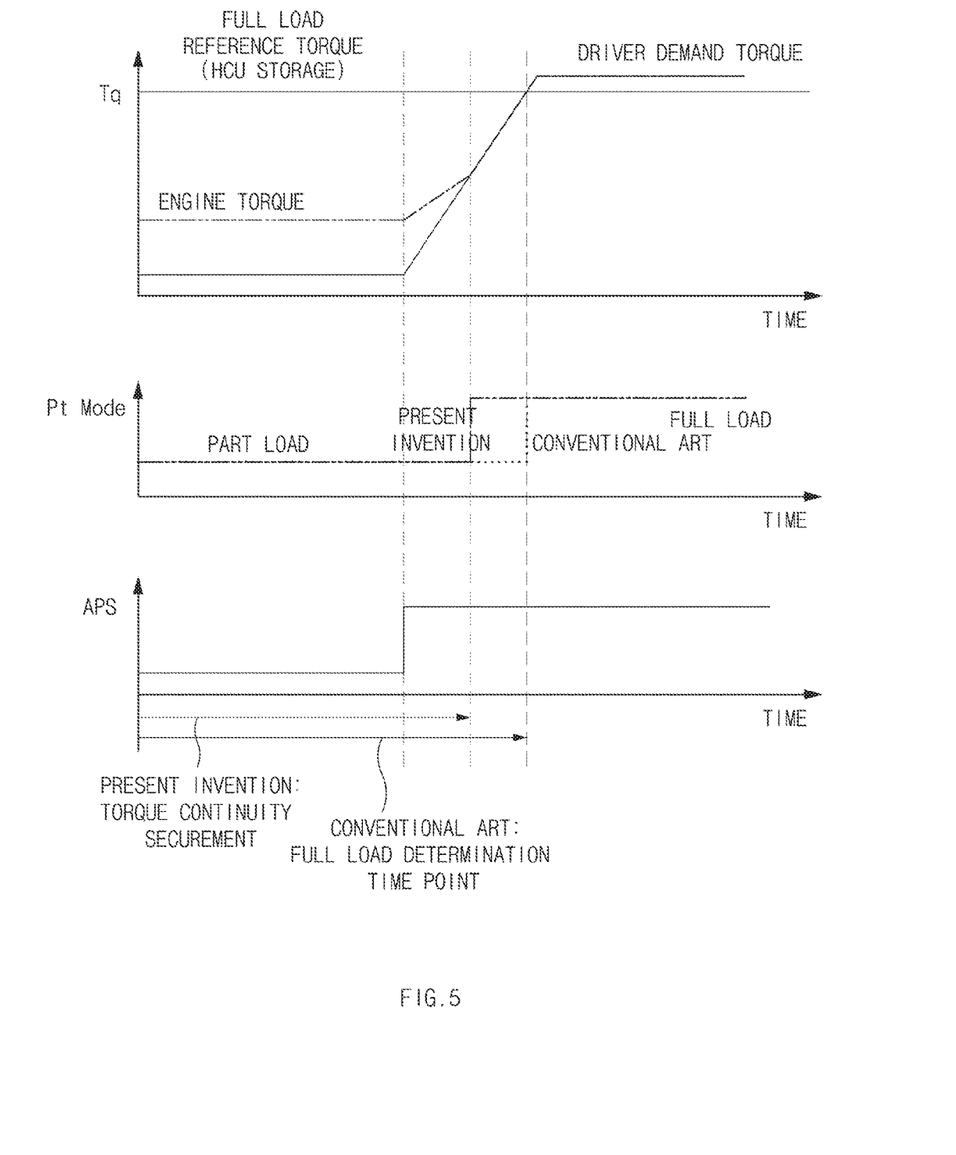

FIGS. 4 and 5 are views showing an engine mode according to a position of an accelerator pedal according to an exemplary embodiment of the present disclosure and a conventional vehicle. As shown in FIG. 4, the driver demand torque (Demand Tq_Base) according to the position of the accelerator pedal is immediately changed, but the driver demand torque (actual demand torque) (Demand Tq) actually applied to the engine is gradually changed by considering an operability of the vehicle. Accordingly, when the position of the accelerator pedal is rapidly changed, a difference occurs between the driver demand torque (Demand Tq_Base) and the actual demand torque (Demand Tq).

When the position of the accelerator pedal is rapidly changed in a conventional vehicle, the engine mode is immediately transitioned to the full load mode from the part load mode, and thus the engine torque (Engine Tq_Before)

is instantly dropped. As a result, an acceleration delay of the engine and a sense of difference caused by a variation in engine torque occur.

Different from the above, although the position of the accelerator pedal is rapidly changed, the transition to the full load mode is permitted at a time point at which the actual demand torque (Demand Tq) becomes equal to or greater than the engine torque (Engine Tq_After) after verifying whether the actual demand torque (Demand Tq) is the engine torque. As described above, since the transition to the full load mode is delayed in the present disclosure, a period in which the engine is operated in the part load mode increases. Accordingly, accuracy of the engine torque and an engine's efficiency are improved, and thus an ignition angle control is unnecessary.

Referring to FIG. 5, when the position of the accelerator pedal is rapidly changed in the conventional vehicle, the engine mode is transitioned to the full load mode at a time point at which the driver demand torque exceeds a previously-stored full load reference torque. However, when the position of the accelerator pedal is rapidly changed in the present disclosure, the engine mode is transitioned to the full load mode from the part load mode at a time point at which the driver demand torque becomes equal to or greater than the engine torque. Accordingly, in the present disclosure, a torque continuity is secured, and the sense of difference occurring when the engine mode is transitioned to the full load mode is improved.

Even though it is described above that all the components configuring the exemplary embodiment of the present disclosure as described above are coupled as one or are operated by being coupled with each other, the present disclosure is not necessarily limited to the exemplary embodiments. That is, all the components may be operated by being optionally coupled with each other within the scope of the present disclosure. All the components may be each implemented in one independent hardware, but a part or all of the respective components may be selectively combined to be implemented as a computer program having a program module performing some functions or all the functions combined in one or a plurality of hardware.

According to the above described embodiments, the acceleration delay of the engine and the sense of difference caused by the variation in engine torque may be improved by delaying the transition time point of the engine mode when the driver demand torque based on the position of an accelerator pedal is less than the current engine torque even though the position of the accelerator pedal satisfies the full load mode entry condition while the engine mode is transitioned to the full load mode from the part load mode. In other words, although the position of the accelerator pedal is rapidly changed, the transition of the engine mode to the full load mode is prohibited when the driver demand torque is less than the engine actual torque and the engine mode is maintained in the part load mode, thereby improving the sense of difference. In addition, since the engine mode enters the full load mode at the time point at which the engine is required to be operated in the full load mode, a fuel efficiency is improved. Further, the period in which the engine is operated in the part load mode increases, and thus the accuracy of the engine torque may be secured.

What is claimed is:
1. An engine control apparatus, comprising:
an engine;
an accelerator pedal position sensor configured to measure a position of an accelerator pedal in response to an operation of the accelerator pedal;
a memory configured to store a map data;
a vehicle controller configured to calculate a driver demand torque based on the position of the accelerator pedal, to determine a current engine torque based on the map data, to verify whether the driver demand torque is equal to or greater than the current engine torque when the position of the accelerator pedal is deviated from a reference position while the engine is operated in a part load mode and to determine a transition of an engine mode of the engine to a full load mode; and
an engine controller configured to transition the engine mode to the full load mode from the part load mode in response to a control signal from the vehicle controller,
wherein the engine controller detects a throttle valve opening using a sensor and provides the detected throttle valve opening to the vehicle controller, and
wherein the vehicle controller determines whether the engine is operated in the part load mode based on the detected throttle valve opening.

2. The engine control apparatus of claim 1, wherein the vehicle controller is configured to:
prohibit the transition of the engine mode to the full load mode when the position of the accelerator pedal remains in the reference position.

3. The engine control apparatus of claim 1, wherein the vehicle controller is configured to:
prohibit the transition of the engine mode to the full load mode in a case that the driver demand torque is less than the current engine torque.

4. The engine control apparatus of claim 1, wherein the vehicle controller is configured to:
calculate the driver demand torque based on a position of a brake pedal, a current gear position, and a vehicle speed measured using sensors.

5. An engine control method, comprising:
detecting, by an engine controller, a throttle valve opening using a sensor;
determining, by a vehicle controller, whether an engine is operated in a part load mode based on the detected throttle valve opening;
sensing, by an accelerator pedal position sensor, an operation of an accelerator pedal while the engine is operated in the part load mode;
verifying, by the vehicle controller, whether a position of the accelerator pedal according to the operation of the accelerator pedal is deviated from a reference position;
calculating, by the vehicle controller, a driver demand torque based on the position of the accelerator pedal;
determining, by the vehicle controller, a current engine torque based on a map data stored in a memory;
verifying, by the vehicle controller, whether the driver demand torque is equal to or greater than the current engine torque when the position of the accelerator pedal based on the operation of the accelerator pedal is deviated from the reference position; and
determining, by the vehicle controller, a transition of an engine mode of the engine to a full load mode based on whether the driver demand torque is equal to or greater than the current engine torque.

6. The engine control method of claim 5, wherein the verifying of whether the position of the accelerator pedal is deviated from the reference position includes: prohibiting the transition of the engine mode to the full load mode when the position of the accelerator pedal remains in the reference position.

7. The engine control method of claim 5, wherein the determining of the permission of the transition to the full load mode includes: permitting the transition of the engine mode to the full load mode from a part load mode when the drive demand torque is equal or greater than the current engine torque.

8. The engine control method of claim 5, wherein the determining of the permission of the transition to the full load mode includes prohibiting the transition of the engine mode to the full load mode when the driver demand torque is less than the current engine torque.

9. The engine control method of claim 5, wherein the driver demand torque is calculated based on a position of a brake pedal, a current gear position, and a vehicle speed measured using sensors.

10. A non-transitory computer readable medium containing program instructions executed by a processor, the non-transitory computer readable medium comprising:
   program instructions that detect a throttle valve opening using a sensor;
   program instructions that determine whether an engine is operated in a part load mode based on the detected throttle valve opening;
   program instructions that sense an operation of an accelerator pedal while the engine is operated in the part load mode;
   program instructions that verify whether a position of the accelerator pedal according to the operation of the accelerator pedal is deviated from a reference position;
   program instructions that calculate a driver demand torque based on the position of the accelerator pedal;
   program instructions that determine a current engine torque based on a map data stored in a memory;
   program instructions that verify whether the driver demand torque is equal to or greater than the current engine torque when the position of the accelerator pedal based on the operation of the accelerator pedal is deviated from the reference position; and
   program instructions that determine a transition of an engine mode of the engine to a full load mode based on whether the driver demand torque is equal to or greater than the current engine torque.

11. The non-transitory computer readable medium of claim 10, wherein the program instructions that verify whether the position of the accelerator pedal is deviated from the reference position include: program instructions that prohibit the transition of the engine mode to the full load mode when the position of the accelerator pedal remains in the reference position.

12. The engine control method of claim 10, wherein the program instructions that determine the permission of the transition to the full load mode include: program instructions that permit the transition of the engine mode to the full load mode from a part load mode when the drive demand torque is equal or greater than the current engine torque.

13. The engine control method of claim 10, wherein the program instructions that determine the permission of the transition to the full load mode include program instructions that prohibit the transition of the engine mode to the full load mode when the driver demand torque is less than the current engine torque.

14. The engine control method of claim 10, wherein the driver demand torque is calculated based on a position of a brake pedal, a current gear position, and a vehicle speed measured using sensors.

* * * * *